United States Patent [19]

Belke et al.

[11] 4,313,301

[45] Feb. 2, 1982

[54] ROTATING FLUIDIZED BED HEAT EXCHANGER

[75] Inventors: William H. Belke, Peoria; Alexander Goloff, East Peoria; George B. Grim, Washington, all of Ill.

[73] Assignee: Caterpillar Tractor Co., Peoria, Ill.

[21] Appl. No.: 102,196

[22] PCT Filed: Oct. 25, 1979

[86] PCT No.: PCT/US79/00937

§ 371 Date: Oct. 25, 1979

§ 102(e) Date: Oct. 25, 1979

[87] PCT Pub. No.: WO81/01194

PCT Pub. Date: Apr. 30, 1981

[51] Int. Cl.³ .......................... F02C 7/08; F28D 13/00
[52] U.S. Cl. ................. 60/39.51 H; 165/86; 165/104.16
[58] Field of Search ................ 165/104 F, 86, 104.16; 60/39.51 R, 39.51 H

[56] References Cited

U.S. PATENT DOCUMENTS

| | | | |
|---|---|---|---|
| 2,818,236 | 12/1957 | Blaskowski | 165/104 F |
| 2,895,719 | 7/1959 | Blaskowski | 165/104 F X |
| 2,919,118 | 12/1959 | Hunter | 165/104 F |
| 3,267,564 | 8/1966 | Keyes | 165/179 X |
| 3,912,002 | 10/1975 | Elliott | 165/107 X |
| 4,161,103 | 7/1979 | Horgan et al. | |
| 4,177,636 | 12/1979 | Horgan | |
| 4,183,208 | 1/1980 | Horgan et al. | |

FOREIGN PATENT DOCUMENTS 1322338 7/1923 United Kingdom ........... 60/39.51 R

OTHER PUBLICATIONS

J. Swithenbank, "Rotating Fluidized Bed Combuster/Gasifier".
Demircan, et al., "Rotating Fluidized Bed Combuster", *Fluidization*, Cambridge University Press (1978), pp. 270-275.
Broughton, et al., "Heat Transfer and Combustion in Centrifugal Fluidized Bed", I. Chem E. Sympos. Ser. No. 43 (Jun., 1975).

*Primary Examiner*—Albert W. Davis
*Attorney, Agent, or Firm*—Sixbey, Friedman & Leedom

[57] ABSTRACT

A rotating fluidized bed heat exchanger particularly adaptable as a heat exchange unit in the recuperator section of conventional gas turbine engines comprising an annular fluidized bed, defined by inner and outer spaced apart coaxial cylindrical, perforated walls, which rotates about the longitudinal axis of the cylinders. The bed is comprised of pulverulent inert particulate material and includes fluid-containing heat exchange tubes passing substantially longitudinally therethrough. Hot gases, such as turbine exhaust gases, enter the bed through the outer perforated wall, heat and fluidize the bed particles, heat the fluid, usually compressed air, in the tubes, and exit the bed through the inner perforated wall. The heat exchange tubes direct the fluid flowing therein from an inlet adjacent the inner perforated wall to an outlet adjacent the outer perforated wall such that the fluid flows substantially countercurrently to the hot fluidizing gas. In a preferred embodiment, the heat exchange tubes comprise an inlet tube extending longitudinally adjacent the inner perforated wall, an outlet tube extending longitudinally adjacent the outer perforated wall and a plurality of tubes interconnecting the inlet and outlet tubes.

30 Claims, 4 Drawing Figures

ROTATING FLUIDIZED BED HEAT EXCHANGER

TECHNICAL FIELD

The present invention relates to fluidized bed heat exchangers, and, more particularly, to rotating fluidized bed heat exchangers especially useful in gas turbine engines.

BACKGROUND ART

In recent years fluidized beds have found many diverse uses in power generation systems and chemical processes. They have served as chemical reactors, particularly for finely divided materials; as incinerators for liquid, solid or gaseous substances; as pressurized or atmospheric, coal-, lignite-, petroleum-, peat-, wood- and/or paper-fired boiler or combustor units for power generation; and, as sites for various process treatments such as drying, baking, coating, oxidizing, etc.

Typically, fluidized beds which are in use today are static beds established when air or other fluidizing gas is introduced into a plenum chamber under pressure and forced upwardly through a diffusing medium (e.g., membrane, grate) to a superimposed chamber containing a particulate bed, of inert or reactive, finely divided, pulverulent solid material. Gas, forced upwardly through the diffusing medium into the fluidizing chamber under a sufficient predetermined pressure, fluidizes the particulates. The gas pressure required to accomplish this is determined, in part, by the nature and degree of fineness of the particulates to be fluidized. Other influencing factors are the depth of the bed and the size, number and design of the plenum chamber compartments and passages into the superimposed fluidizing chamber.

In conventional, static fluidized beds, by and large, the rate at which the fluidizing air can be blown through the bed is limited by the fact that only the gravity force on the bed particles opposes the balancing air force needed to maintain fluidization. In rotating fluidized beds, the fluidizing air forced through the bed opposes the centrifugal force tending to throw the bed particles outwardly from the bed axis of rotation toward the bed periphery. The extent of the centrifugal force and, thus, of the opposing fluidizing air flow rate can be controlled by controlling the speed of bed rotation. A form of rotating fluidized bed combustor system is disclosed by J. Swithenbank in his article "Rotating Fluidized Bed/Combustor/Gasifier". The Swithenbank system includes a vertical shaft around which rotates a generally cylindrical combustor using natural gas as the fuel. The gas is introduced at the center of the combustor, i.e., along the axis of rotation, and is mixed with fluidizing air forced through the bed particles from the bed periphery toward the center. The bed, which is heated by the combustion heat generated and the mixing action accompanying rotation, preheats the entering fluidizing air. Most of the combustion between the heated air and the natural gas appears to occur outside, rather than within, the bed itself. Cooling coils passing through the bed carry air which is heated by the combustion and serve to control the bed and exhaust gas temperature. Swithenbank states that his combustion system may be operated by burning or gasifying coal granules in the fluidized bed, but discloses no combustor configuration suitable for use with coal fuels. Moreover, Swithenbank's configuration, requiring introduction of the fuel along the axis of rotation, detracts from the attainment of maximum energy density because it diminishes the compactness of the system. See also, Demircan et al, *Rotating Fluidized Bed Combustor,* published in "Fluidization" by Cambridge University Press (1978). Other publications of interest in connection with the heat transfer and combustion characteristics of natural gas fueled rotating fluidized beds are J. Broughton and G. E. Elliott, *Heat Transfer and Combustion in Centrifugal Fluidized Bed,* I. Chem E. Symposium Series No. 43 (paper presented at June, 1975 meeting), and G. C. Lindauer et al, *Experimental Studies on High Gravity Rotating Fluidized Bed,* U.S. Atomic Energy Commission, BNL-50013 (Sept. 1966).

One of the important characteristics of a fluidized bed is its very high heat transfer. The values for the heat transfer coefficient between the bed and surfaces within the bed have been reported as high as 180 BTU/hr-ft$^2$-°F. for a static fluidized bed. In rotating beds, heat transfer coefficients along surfaces within the bed may be on the order of 240 BTU/hr-ft$^2$-°F. By comparison the heat transfer coefficient between a tube and gas flowing therewithin in conventional, non-fluidized bed environments is on the order of 10–25 BTU/hr-ft$^2$-°F. Investigations have determined that the characteristics of rotating fluidized beds which lead to such unusually high heat transfer coefficients within the bed can be used to great advantage in a heat exchanger. In particular, the high heat transfer coefficient of surfaces in a fluidized bed suggests that there is potential for the application of rotating fluidized bed heat exchangers as alternatives to primary surface heat exchangers in gas turbine engines.

The foregoing illustrates limitations of the known prior art. Thus, it is apparent that it would be advantageous to provide an alternative to the prior art.

DISCLOSURE OF INVENTION

In one aspect of the present invention this is accomplished by providing a rotating fluidized bed heat exchanger including a fluidization chamber containing a bed of fluidized pulverulent solid particles in which a plurality of heat exchanger tubes are disposed. The fluid to be heated is directed via the tubes through the fluidized bed and is heated by a relatively hot fluid stream passing over the tubes.

In another aspect of the invention, the chamber includes first and second spaced apart apertured or perforated walls, means are provided for rotating the chamber about an axis to cause the bed particles to centrifugally gravitate toward the first perforated wall, the relatively hot fluid stream, which is preferably a gaseous fluidizing stream, is fed into the chamber through the first perforated wall, over the heat exchanger tubes and exits the chamber through the second perforated wall.

In a particularly preferred form of the invention, the first and second walls are substantially cylindrical and comprise the outer and inner coaxial walls, respectively, of the fluidization chamber. As the chamber is rotated about its axis, the bed particles centrifugally gravitate toward the outer wall. A relatively hot gaseous agent is fed into the chamber through the outer perforated wall, passes through and fluidizes the bed particles, passes over the heat exchanger tubes and exits the chamber through the inner perforated wall. The gas to be heated enters an inlet tube which extends substantially longitudinally along the inner wall, is directed radially outwardly toward the outer wall and exits the bed through an outlet tube which extends substantially longitudinally along the outer wall. As a result the gas to be heated flows substantially countercurrently to the flow of the fluidizing hot gas stream.

In an especially useful application, the rotating fluidized bed heat exchanger of the present invention is employed as the recuperator section heat exchanger in a conventional gas turbine engine. The heat exchanger transfers the thermal energy from relativley hot turbine engine exhaust gases to the relatively cool inlet compressed air directed to the combustor.

The foregoing and other apects will become apparent from the following detailed description of the invention when considered in conjunction with the accompanying drawings. It is to be expressly understood, however, that the drawings are not intended as a definition of the invention but are for the purpose of illustration only.

BEST MODE FOR CARRYING OUT THE INVENTION

Figure 1:
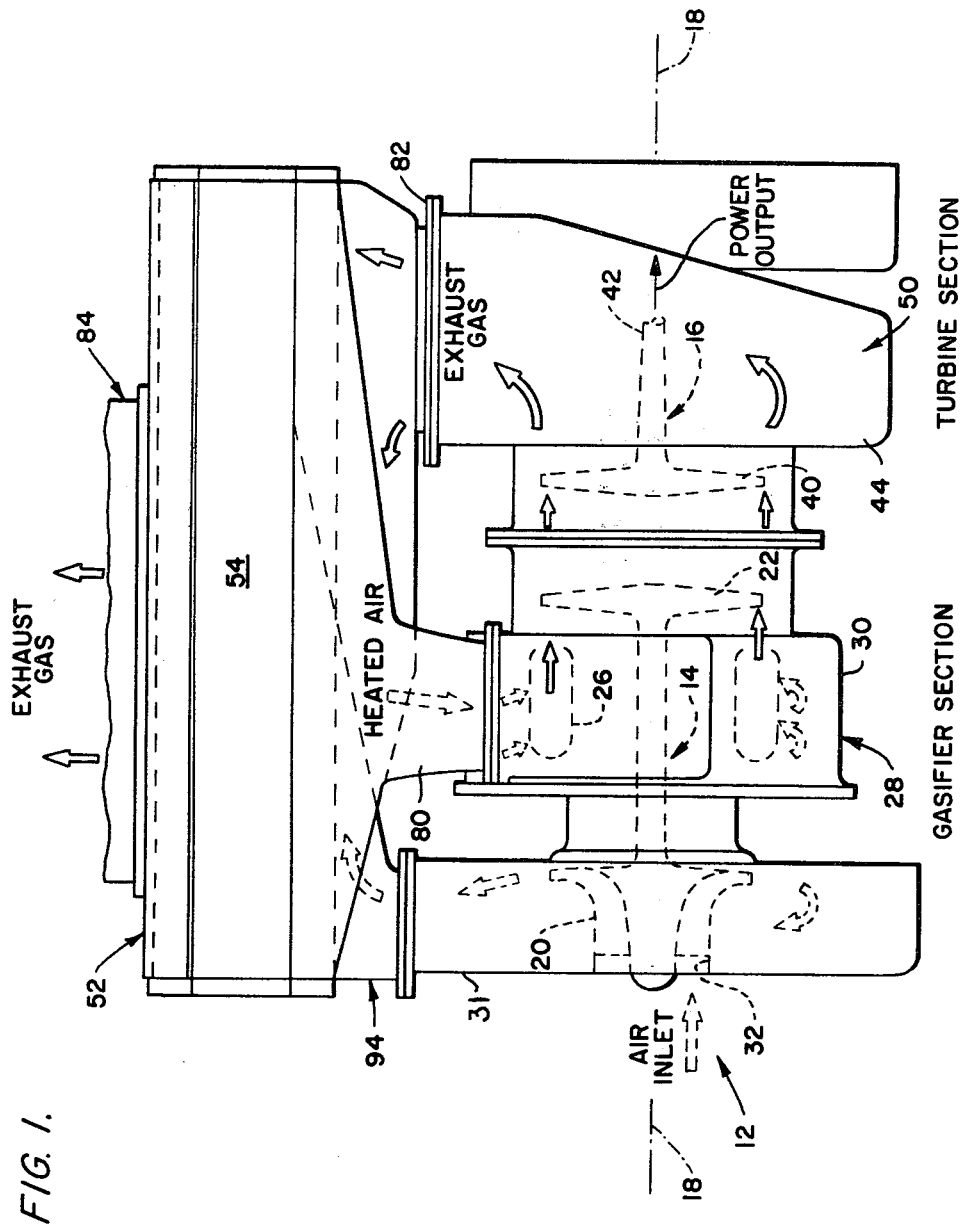
FIG. 1 is a side elevational schematic view of a conventional gas turbine engine in which the rotating fluidized bed heat exchanger of the present invention may be used.

The rotating fluidized bed heat exchanger of the present invention has wide utility wherever heat exchangers may be used but is particularly adaptable for mounting on a gas turbine engine to transfer the residual thermal energy of the power turbine exhaust gases to the compressed air fed to the gas turbine combustors. With reference to FIG. 1, the rotating fluidized bed heat exchanger of the present invention can be intimately mounted within and supported by an otherwise conventional gas turbine engine 12. The gasifier section 28 of engine 12 includes a rotatable front shaft assembly 14 having a compressor 20, an integrally associated gasifier turbine 22 for driving the compressor and combustors 26, which may conventionally comprise a fuel injector and combustion chamber. A gasifier section housing 30, including a front air inlet opening 32, directs the air and gases therethrough and supportably contains the front shaft assembly 14. The turbine section 50 of engine 12 includes a rotatable rear shaft assembly 16 aligned with the front shaft assembly along central longitudinal axis 18. Rear shaft assembly 16 has a power turbine 40 and an integrally associated output shaft 42 which drives a suitable load. A rear housing 44 supportably contains the rear shaft assembly 16 and provides hot gas inlet and exhaust gas outlet openings. A recuperator section 52, which typically includes at least one conventional heat exchanger unit, but in connection with the present invention comprises at least one rotatable fluidized bed heat exchanger 54, is supportably mounted on front housing 30 and rear housing 44. The recuperator section provides a hot exhaust gas inlet 82, a cooled exhaust gas outlet 84 and appropriate ducting, including an air inlet duct 94 and a heated air outlet duct 80, to channel the flow of inlet air from the compressor 20 through the heat exchanger unit in a predetermined flowpath defined by heat exchange tubes therein. The air is heated while passing in heat exchange relation with the hot exhaust gases, which also pass through the heat exchanger unit along a predetermined flowpath over the heat exchange surfaces therein, and is directed into the combustors 26 for use as the combustion air source.

The foregoing will be further amplified by the following brief summary of operation wherein the flow path of the relatively hot engine exhaust gas is indicated on FIG. 1 by solid arrows, while the flow path of the relatively cooler air is indicated by broken line arrows.

Referring to FIG. 1, the gasifier section 28 of the gas turbine engine 12 cooperates with the turbine section 50 and recuperator section 52 in the following manner. With rotation of the front shaft assembly 14 the compressor portion 20 draws air axially through the inlet opening 32 into the housing 31 and discharges pressurized and somewhat heated air into the recuperator section air inlet duct 94. The compressed air enters the heat exchanger unit or units 54 where it is heated as it travels along a defined flow path through heat exchange tubes therein. After being heated the air passes out of the heat exchanger unit and is directed through outlet duct 80 into the front housing 30 where it is led to the combustors 26.

Fuel is added to combustors 26 to react with the beneficially heated and compressed air to produce hot combustion gases. These gaseous products of combustion (shown hereinafter as solid arrows) are allowed to flow axially rightwardly when viewing FIG. 1 to impinge on and to powerably drive the gasifier turbine 22. Thus, the combustor exhaust gas serves to initially rotate the gasifier turbine to drive the integrally associated compressor 20. Thereafter, the exhaust gas travels further rightwardly from within the front housing 30 to the rear housing 44 where it impinges on and powerably drives the power turbine 40 which subsequently delivers useful power to any applied load via the output shaft 42. The exhaust gas can be effectively utilized to heat air, or even liquids, through an associated exhaust heat exchanger system. In the conventional gas turbine engine, the gas travels generally upwardly through the recuperator section 52 to transfer its heat to the inlet air. Specifically, the exhaust gas provides useful energy recovery by passing upwardly from within the rear housing 44 through recuperator section exhaust gas inlet 82 and through appropriate ducting into the fluidized bed rotating heat exchanger unit 54 of the present invention where it is cooled as it travels along a defined flow path over the heat exchange surfaces and gives up its heat to the inlet air (which preferably flows countercurrently thereto). The cooled exhaust gas is delivered through exhaust gas outlets 84 to the atmosphere.

Figure 2:
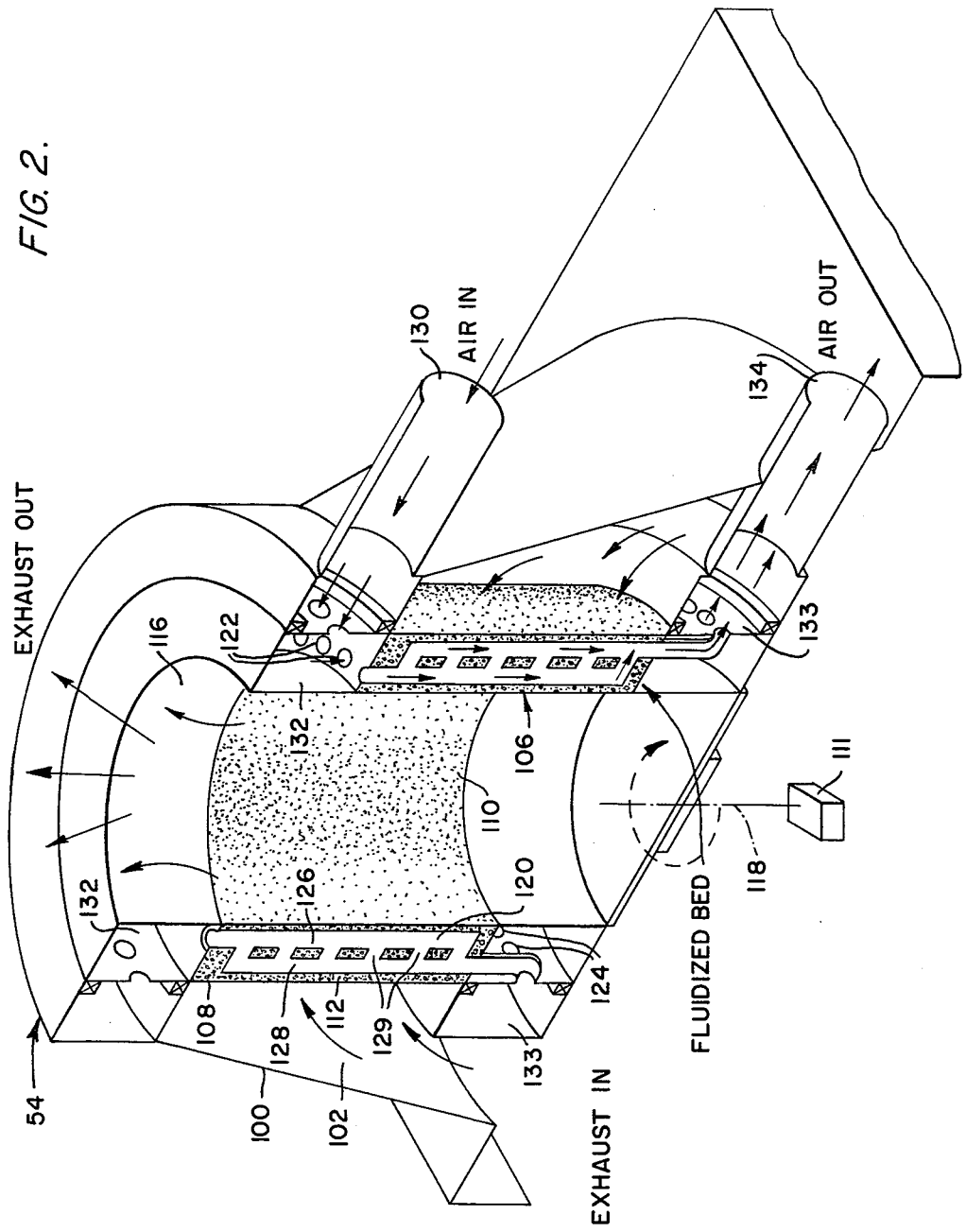
FIG. 2 is a perspective view of the interior of a rotating fluidized bed heat exchanger of the present invention, showing exhaust heating gas and compressed air flow paths therethrough.
Figure 3:
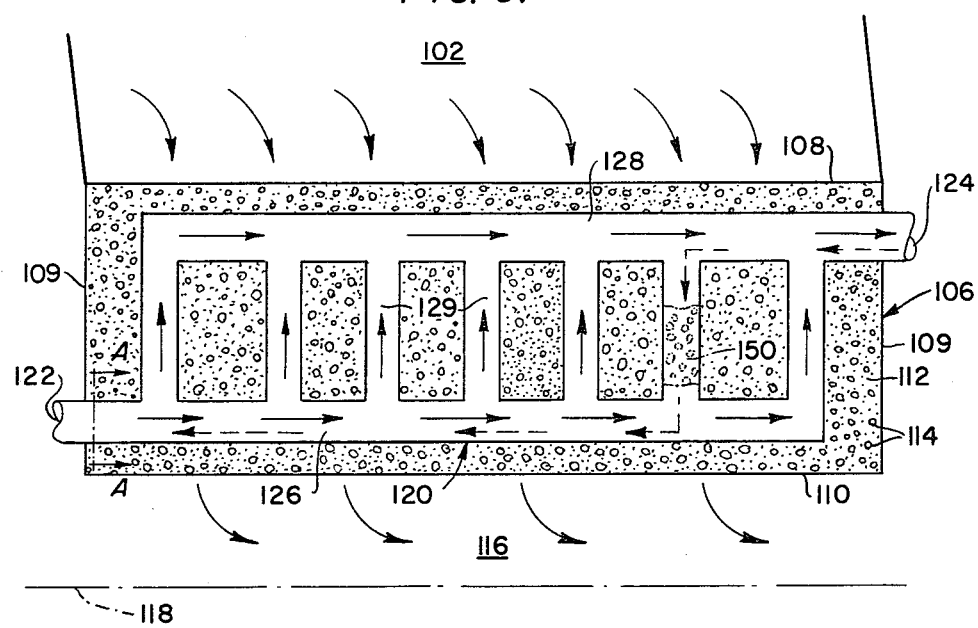
FIG. 3 is a schematically simplified sectional view of one embodiment of the rotating fluidized bed heat exchanger of the present invention.
Figure 4:
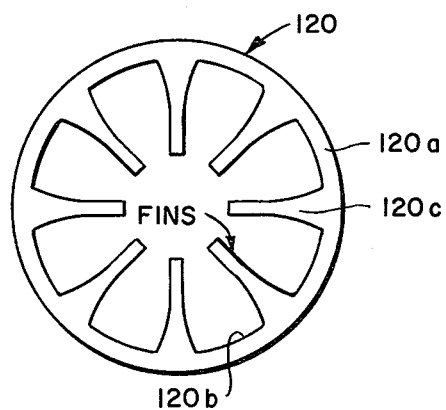
FIG. 4 is a section view along line A—A of FIG. 3 showing an exemplary finned interior wall construction for the heat exchanger tubes.

Referring now to FIGS. 2-4 a preferred form of rotating fluidized bed heat exchanger 54 of the present invention is more clearly depicted. As can be seen in detail the heat exchanger 54 comprises a housing 100 which includes a chamber 102 into which a relatively hot first fluid, for example hot turbine exhaust gas, may pass and be directed through the rotating fluidized bed of the heat exchanger as the heating and fluidizing medium therefor. Alternatively if the relatively hot first fluid cannot be used to fluidize the bed, it may be used solely for heating purposes and a gaseous agent fed to the bed as the fluidizing medium. When the relatively hot first fluid is hot turbine exhaust, chamber 102 is in fluid flow communication with exhaust gas inlet 82 (see FIG. 1). The relatively hot first fluid gives up a portion of its thermal energy in passing through the heat exchanger 54 and exits as a cooled first fluid. The thermal energy transferred from the relatively hot first fluid heats the fluidized bed particles and heats a relatively cool second fluid, for example, gas turbine engine compressed inlet air, which is directed through heat exchange tubes disposed within the fluidized bed. For ease of description the present invention will be described in connection with its use as a heat exchanger in the recuperator section of a conventional gas turbine engine wherein the relatively hot first fluid is power turbine exhaust gas and the relatively cool second fluid is compressed inlet air.

The fluidized bed portion 106 of heat exchanger 54 comprises an outer perforated cylindrical wall 108, an inner perforated cylindrical wall 110 and appropriate enclosing walls 109 (FIG. 3) defining therebetween an annular fluidizing chamber 112 in which pulverulent solid inert particles 114 such as sand, dolomite, coal ash, etc., are disposed. The perforations in walls 108 and 110 are small enough to contain particles 114 within chamber 112 but large enough to sustain the free flow of relatively hot fluidizing exhaust gas from the inlet chamber 102 through wall 108, into and through chamber 112, through wall 110 and into outlet core chamber 116.

The fluidized bed portion 106 rotates on horizontal, vertical or other appropriate axis, perferably about a longitudinal axis 118 which corresponds to the axis of coaxial cylindrical walls 108 and 110. Rotation is motivated by available rotational means 111, such as appropriate gearing to drives for other conventional engine functions, and is controlled to a speed sufficient to impart a centrifugal force to the particles 114 within the bed equal to the velocity force of the hot gas. The centrifugal force causes the particles 114 to gravitate away from the axis 118 toward outer perforated wall 108. The flow of hot, exhaust gas from inlet chamber 102 through perforated outer wall 108 opposes the centrifugally induced movement of the particles 114 and, in so doing, fluidizes the bed. The thermal energy of the hot exhaust gas heats the bed particles and the compressed air flowing within the heat exchange tubes 120 which extend substantially longitudinally through the bed. The resulting cooled exhaust gas leaves the bed through perforated wall 110 and passes into outlet core chamber 116 of heat exchanger 54. In the preferred embodiment illustrated in FIG. 2, core 116 is an elongated cylindrical chamber which directs the flow of cooled exhaust gas to the atmosphere through appropriate exhaust means, such as exhaust gas outlets 84 in FIG. 1.

The temperature within the bed is controlled in part by the temperature and flow rate of hot exhaust gas fed into the bed. In addition, bed temperature is controlled by controlling the amount of heat transfer to cooling tubes (or coils) 120 which pass substantially longitudinally through the bed. Tubes 120 generally rotate with the bed although it is not necessary that they do. In a preferred embodiment the tubes 120 direct the flow of compressed air longitudinally within the bed from an air inlet 122 generally adjacent perforated wall 110 to an air outlet 124 generally adjacent perforated wall 108. In this manner, the compressed air flows generally countercurrently to the direction of fluidizing hot exhaust gas flow through the bed. More specifically, tubes 120 include an inlet tube 126 extending longitudinally from air inlet 122 along cylindrical wall 110, an outlet tube 128 extending longitudinally along cylindrical wall 108 to air outlet 124 and a plurality of tubes 129 interconnecting the inlet and outlet tubes 126, 128. The interconnecting tubes 129 extend generally radially between the inlet and outlet tubes 126, 128. Compressed air entering tubes 120 through air inlet 122 is directed longitudinally along the length of the fluidized bed portion 106 in inlet tube 126, radially relative to bed axis 118 in interconnecting tubes 129 and longitudinally along the length of the fluidized bed portion 106 in outlet tube 128 to air outlet 124. It is during the passage of the compressed air through the interconnecting tubes 129 that its flow is countercurrent or substantially opposite in direction to the flow of fluidizing and heating hot exhaust gas through the bed. Desirably compressed air is fed to and ducted away from the tubes 120 through a combination of conduits and plenums. As can be seen most clearly in FIG. 2, relatively cool compressed air is directed through inlet conduit means 130 to an inlet air plenum 132 which includes apertures in fluid flow communication with air inlets 122 (see particularly FIG. 2). After passing through the tubes 120 the compressed air is heated and is directed from air outlets 124 through an outlet air plenum 133 into outlet conduit means 134 away from the heat exchanger to serve some useful purpose, for example as inlet air to the combustors in a conventional gas turbine engine.

It will be appreciated that the heat transfer coefficient between the heated fluidized bed particles 114 and the outer diameter surface 120a of the tubes 120 therein, particularly for a rotating fluidized bed, is extremely high, on the order of 240 BTU/hr-ft$^2$-°F. On the other hand the heat transfer coefficient between the compressed air and the inner diameter surface 120b of the tubes 120 is typically about 10–25 BTU/hr-ft$^2$-°F. Inasmuch as the amount of thermal energy which can be transferred through a surface is directly proportional to both the heat transfer coefficient and the surface area available for heat transfer, the limiting factor in transferring heat from the bed to the compressed air is the relatively poor heat transfer conditions inside tubes 120. This problem can be considerably alleviated by increasing either the heat transfer coefficient or the inner surface area of the tubes. For example, as shown in FIG. 4, the inner surface 120b can be increased, such as by a factor of 5 to 15, by providing a plurality of fins 120c therealong which extend generally radially into the flow area of the tubes. Alternatively, the inner surface heat transfer coefficient can be increased by creating a fluidized bed within tubes 120. This can be achieved using the heat exchanger configuration already described except that appropriate inert pulverulent solid fluidizable particles 150 (shown in phantom on FIG. 3) are disposed within tubes 120 and the direction of compressed air flow through tubes 120 is generally the same as the direction of hot exhaust gas flow through the bed. Thus, in this embodiment (flow direction through the interconnecting tube 129 shown in phantom on FIG. 3) the direction of compressed air flow is reversed, i.e., the air inlet and inlet tube become the air outlet and outlet tube and the air outlet and outlet tube become the air inlet and inlet tube. In this manner compressed air flow within the interconnecting tubes 129 is generally from the outer perforated wall 108 toward the inner perforated wall 110. The centrifugal force caused by bed rotation causes the particles within the tubes 120 to gravitate away from axis 118 toward outer wall 108 and the opposing flow of compressed air within the tubes fluidizes these particles.

INDUSTRIAL APPLICABILITY

The rotating fluidized bed heat exchanger of the present invention has broad applicability but is particularly useful as the recuperator section heat exchanger or heat exchangers in conventional gas turbine engines. When operating in this capacity the heat exchanger may rotate about the horizontal, vertical or other suitable axis and rotation is motivated by suitable gearing to other conventional engine functions. With particular reference to FIGS. 1 and 2, upon rotation of the front shaft assembly 14, the compressor 20 draws air into inlet opening 32 and directs the air flow into rotating fluidized bed heat exchanger 54 through recuperator section inlet duct 94 and inlet conduit means 130. The compressed air enters inlet plenum 132 and is distributed via air inlets 122 into tubes 120 in the fluidized bed. Compressed air flows through the bed within inlet tube 126, through interconnecting tubes 129, within outlet tube 128 and exits the bed via air outlets 124 and outlet plenum 133 into outlet conduit means 134. In its passage through tubes 120 the relatively cool compressed air is heated and the heated compressed air is directed from outlet conduit means 134 via recuperator section outlet duct 80 into combustors 26 wherein it is reacted with fuel to form gaseous combustion products. The gaseous combustion products drive the gasifier turbine 22 which, via shaft 14, drives compressor 20. The combustion gas exhaust from the gasifier turbine is directed through the vanes of the power turbine 40 which delivers useful output work via output shaft 42. The exhaust gas from the power turbine is then ducted into the recuperator section 52 to serve as the heating and fluidizing gas in the rotating fluidized bed heat exchanger 54 of the present invention. Specifically, the exhaust gas is directed into inlet chamber 102 of heat exchanger housing 100 and through perforated outer wall 108 into fluidization chamber 112. Inasmuch as the rotation of the fluidized bed portion 106 of heat exchanger 54 causes the particles 114 within chamber 112 to gravitate toward outer wall 108, the opposing flow of the exhaust gas into the chamber fluidizes the particles. In passing through the fluidized bed of particles the relatively hot exhaust gas transfers heat to the particles and passes over tubes 120 to transfer heat to the compressed air flowing therein. The resulting cooled exhaust gases pass out of chamber 112 through inner perforated wall 110 into core chamber 116 which directs the flow of cooled exhaust gas to the atmosphere through exhaust gas outlets 84.

It is anticipated that further aspects of the present invention can be obtained from the foregoing description and the appended claims.

We claim:
1. A rotatable fluidized bed heat exchanger (54) comprising:
   a. a first elongated perforated wall (108);
   b. a second perforated wall (110) spaced apart and substantially co-extensive with said first perforated wall (108);
   c. enclosing walls (109) defining with said first and second perforated walls (108,110) a fluidization chamber (112);
   d. a fluidizable bed of pulverulent solid particles (114) in said chamber (112);
   e. means (111) for rotating said chamber (112) about an axis (118) to cause the particles (114) to centrifugally gravitate toward said first perforated wall (108);
   f. means (102) for feeding a relatively hot first fluid into said chamber (112) through said first perforated wall (108) and out of said chamber (112) through said second perforated wall (110), said first fluid heating said particles (114) in said chamber (112);
   g. means (102) for feeding a gaseous agent into said chamber (112) through said first perforated wall (108) and out of said chamber (112) through said perforated wall (110), said gaseous agent having flow characteristics suitable for fluidizing said particles (114) in said chamber (112);
   h. at least one tube (120) in said chamber (112) extending substantially co-extensively with said walls (108,110) for passing a relatively cool second fluid therethrough, said at least one tube (120) comprising an inlet tube (126) extending substantially co-extensively with and adjacent said second perforated wall (110), an outlet tube (128) extending substantially co-extensively with and adjacent said first perforated wall (108) and fluid flow means (129) interconnecting said inlet and outlet tubes (126,128), whereby said relatively cool second fluid enters said chamber (112) adjacent said second perforated wall (110), is heated by the heated bed particles and said relatively hot first fluid and exits said chamber (112) adjacent said first perforated wall (108) and said relatively hot first fluid is cooled; and
   i. means (134) for directing said heated second fluid away from said chamber.

2. A heat exchanger, as claimed in claim 1, wherein said relatively hot first fluid is a gas and comprises said gaseous agent for fluidizing said particles in said chamber (112).

3. A heat exchanger, as claimed in claims 1 or 2, wherein said fluid flow means comprises at least one interconnecting tube (129), whereby said relatively cool second fluid in said interconnecting tube flows countercurrently to said relatively hot gas passing through said chamber (112).

4. A heat exchanger, as claimed in claim 3, wherein said fluid flow means comprises a plurality of interconnecting tubes (129).

5. A heat exchanger, as claimed in claims 1 or 2, wherein said means for directing said heated second fluid away from said chamber includes conduit means (134) in fluid flow communication with said outlet tube (128).

6. A heat exchanger as claimed in claims 1 or 2 including means (120c) for increasing the inner diameter surface area (120b) of said at least one tube (120).

7. A heat exchanger, as claimed in claim 6, wherein said surface area increasing means comprises a plurality of fins (120c) extending from said inner surface, (120b) of said at least one tube (120) into the flow area of said tube.

8. A heat exchanger, as claimed in claim 6, wherein said inner diameter surface area increasing means (120c) increases the surface area by a factor of 5 to 15.

9. A heat exchanger, as claimed in claims 1 or 2, wherein said relatively cool second fluid is a gas.

10. A heat exchanger as claimed in claims 1 or 2, wherein said first and second walls (108, 110) are substantially cylindrical and coaxial and said second wall (110) has a smaller diameter than said first wall (108).

11. A heat exchanger, as claimed in claim 10, wherein said chamber (112) comprises the annular space between said walls (108, 110).

12. A heat exchanger, as claimed in claim 11, wherein said axis of rotation is coincident with the longitudinal axis (118) of said cylindrical walls (108, 110).

13. A heat exchanger, as claimed in claim 12, wherein said second perforated wall (110) encloses a cylindrical space (116), said space comprising means for directing said cooled gas to exhaust.

14. A heat exchanger, as claimed in claim 12, wherein said solid particles (114) are inert.

15. In a gas turbine engine (12) including a compressor (20), a combustor (26), a gasifier turbine (22), a first shaft (14) mounting said compressor (20) adjacent a first end thereof and said gasifier turbine (22) adjacent the other end thereof, said turbine (22) having blades positioned in the path of exhaust gases exiting said combustor (26) to drive said first shaft (14) and said compressor (20), a power turbine (40) having blades positioned in the path of exhaust gases exiting said gasifier turbine (22), a second shaft (42) driven by said power turbine (40) for delivering output work, a heat exchanger (54) for receiving compressed gas from said compressor (20), heating said compressed gas therein and passing said heated compressed gas to said combustor (26) and for receiving exhaust gas from said power turbine (40), cooling said exhaust gas while transferring some of its heat to said compressed gas and exhausting the resulting cooled exhaust gas, the improvement comprising:
a rotatable fluidized bed heat exchanger (54) comprising:
a. a first elongated perforated wall (108);
b. a second perforated wall (110) spaced apart and substantially co-extensive with said first perforated wall (108);
c. enclosing walls (109) defining with said first and second perforated walls (108, 110) a fluidization chamber (112);
d. a fluidizable bed of pulverulent solid particles (114) in said chamber (112);
e. means (111) for rotating said chamber (112) about an axis (118) to cause the particles (114) to centrifugally gravitate toward said first perforated wall (108);
f. means for feeding said exhaust gas into said chamber (112) through said first perforated wall (108) and out of said chamber (112) through said second perforated wall (110), said exhaust gas heating and having flow characteristics suitable for fluidizing said particles (114) in said chamber (112);
g. at least one tube (120) in said chamber (112) extending substantially co-extensively with said walls (108, 110) for passing said compressed gas therethrough, said at least one tube (120) comprising an inlet tube (126) extending substantially co-extensively with and adjacent said second perforated wall (110), an outlet tube (128) extending substantially co-extensively with and adjacent said first perforated wall (108) and fluid flow means (129) interconnecting said inlet and outlet tubes (126,128) whereby said compressed gas enters said chamber (112) adjacent said second perforated wall (110), is heated by the heated bed particles and said exhaust gas and exits said chamber (112) adjacent said first perforated wall (108) and said exhaust gas is cooled; and
h. means (134,80) for directing said heated compressed gas to said combustor.

16. A gas turbine engine, as claimed in claim 15, wherein said fluid flow means comprises at least one interconnecting tube (129), whereby said compressed gas in said interconnecting tube flows countercurrently to said exhaust gas passing through said chamber (112).

17. A gas turbine engine, as claimed in claim 16, wherein said fluid flow means comprises a plurality of interconnecting tubes (129).

18. A gas turbine engine, as claimed in claim 15 wherein said means for directing said heated compressed gas to said combustor includes conduit means (134) in fluid flow communication with said outlet tube (128).

19. A gas turbine engine, as claimed in claim 15, including means (120c), for increasing the inner diameter surface area (120b) of said at least one tube (120).

20. A gas turbine engine, as claimed in claim 19, wherein said surface area increasing means comprises a plurality of fins (120c) extending from said inner surface (120b) of said at least one tube (120) into the flow area of said tube.

21. A gas turbine engine, as claimed in claim 19, wherein said inner diameter surface area increasing means (120c) increases the surface area by a factor of 5 to 15.

22. A gas turbine engine, as claimed in claim 15, wherein said first and second walls (108, 110) are substantially cylindrical and coaxial and said second wall (110) has a smaller diameter than said first wall.

23. A gas turbine engine, as claimed in claim 22, wherein said chamber (112) comprises the annular space between said walls (108, 110).

24. A gas turbine engine, as claimed in claim 23, wherein said axis of rotation is coincident with the longitudinal axis (118) of said cylindrical walls (108, 110).

25. A gas turbine engine, as claimed in claim 24, wherein said second perforated wall (110) encloses a cylindrical space (116), said space comprising means for directing said cooled exhaust gas to exhaust.

26. A gas turbine engine, as claimed in claim 24, wherein said solid particles (114) are inert.

27. A rotatable fluidized bed heat exchanger (54) comprising:
a. a first elongated perforated wall (108);
b. a second perforated wall (110) spaced apart and substantially co-extensive with said first perforated wall (108);
c. enclosing walls (109) defining with said first and second perforated walls (108, 110) a fluidization chamber (112);
d. A fluidizable bed of pulverulent solid particles (114) in said chamber (112);
e. means (111) for rotating said chamber (112) about an axis (118) to cause the particles (114) to centrifugally gravitate toward said first perforated wall (108);
f. means (102) for feeding a relatively hot first fluid into said chamber (112) through said first perforated wall (108) and out of said chamber (112) through said second perforated wall (110), said first fluid heating said particles (114) in said chamber (112);
g. means (102) for feeding a gaseous agent into said chamber (112) through said first perforated wall (108) and out of said chamber (112) through said second perforated wall (110), said gaseous agent having flow characteristics suitable for fluidizing said particles (114) in said chamber (112);

h. at least one tube (120) in said chamber (112) extending substantially co-extensively with said walls (108, 110) for passing a relatively cool second fluid therethrough, said at least one tube (120) directing the flow of said relatively cool second fluid longitudinally within said chamber (112) from an inlet (122) generally adjacent said second perforated wall (110) to an outlet (124) generally adjacent said first perforated wall (108), whereby said relatively cool second fluid flows countercurrently to said relatively hot first fluid, said second fluid is heated by the heated bed particles and said relatively hot first fluid and said relatively hot first fluid is cooled; and i. means (134) for directing said heated second fluid away from said chamber.

28. A heat exchanger, as claimed in claim 27, wherein said relatively hot first fluid is a gas and comprises said gaseous agent for fluidizing said particles in said chamber (122).

29. A heat exchanger, as claimed in claims 27 or 35, wherein said relatively cool second fluid is a gas.

30. In a gas turbine engine (12) including a compressor (20), a combustor (26), a gasifier turbine (22), a first shaft (14) mounting said compressor (20) adjacent a first end thereof and said gasifier turbine (22) adjacent the other end thereof, said turbine (22) having blades positioned in the path of exhaust gases exiting said combustor (26) to drive said first shaft (14) and said compressor (20), a power turbine (40) having blades positioned in the path of exhaust gases exiting said gasifier turbine (22), a second shaft (42) driven by said power turbine (40) for delivering output work, a heat exchanger (54) for receiving compressed gas from said compressor (20), heating said compressed gas therein and passing said heated compressed gas to said combustor (26) and for receiving exhaust gas from said power turbine (40), cooling said exhaust gas while transferring some of its heat to said compressed gas and exhausting the resulting cooled exhaust gas, the improvement comprising:

a rotatable fluidized bed heat exchanger (54) comprising:

a. a first elongated perforated wall (108);

b. a second perforated wall (110) spaced apart and substantially co-extensive with said first perforated wall (108);

c. enclosing walls (109) defining with said first and second perforated walls (108, 110) a fluidization chamber (112);

d. a fluidizable bed of pulverulent solid particles (114) in said chamber (112);

e. means (111) for rotating said chamber (112) about an axis (118) to cause the particles (114) to centrifugally gravitate toward said first perforated wall (108);

f. means (102) for feeding said exhaust gas into said chamber (112) through said first perforated wall (108) and out of said chamber (112) through said second perforated wall (110), said exhaust gas heating and having flow characteristics suitable for fluidizing said particles (114) in said chamber (112);

g. at least one tube (120) in said chamber (112) extending substantially co-extensively with said walls (108, 110) for passing said compressed gas therethrough, said at least one tube (120) directing the flow of said compressed gas longitudinally within said chamber (112) from an inlet (122) generally adjacent said second perforated wall (110) to an outlet (124) generally adjacent said first perforated wall (108), whereby said compressed gas flows countercurrently to said exhaust gas, said compressed gas is heated by the heated bed particles and said exhaust gas and said exhaust gas is cooled; and h. means (134, 80) for directing said heated compressed gas to said combustor.

* * * * *